(No Model.)
S. E. NORTON.
FLOUR SIFTER SAFE.
No. 352,343. Patented Nov. 9, 1886.
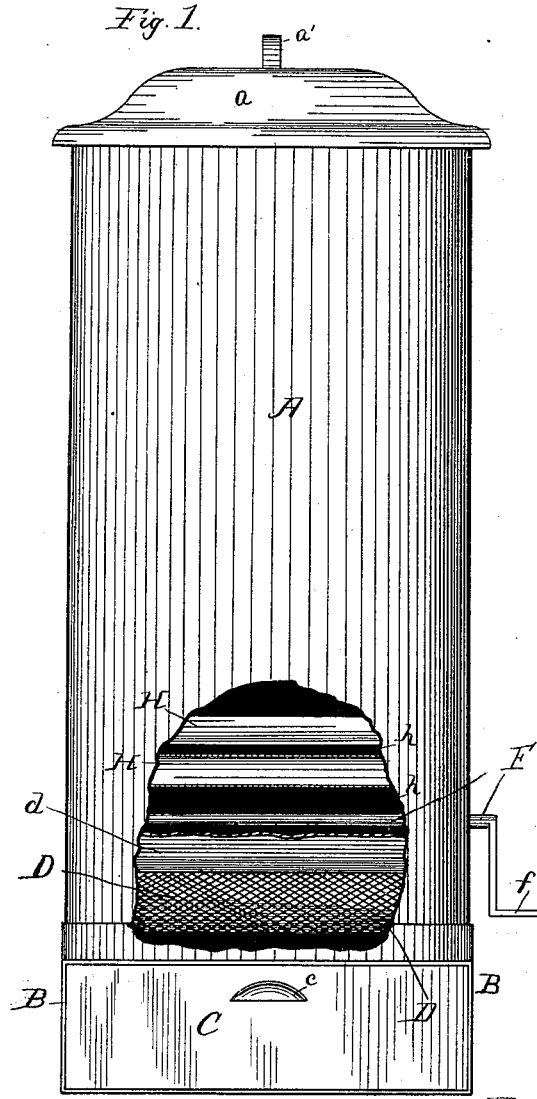
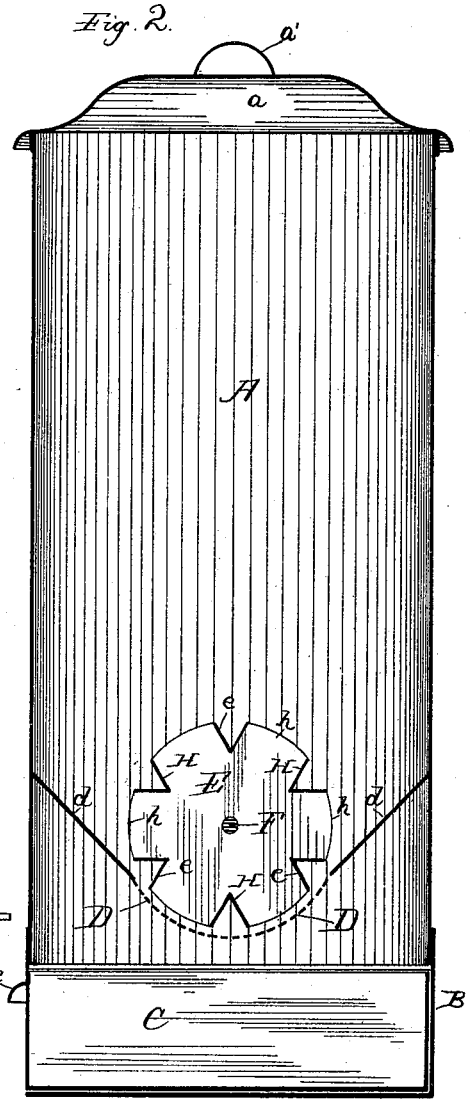
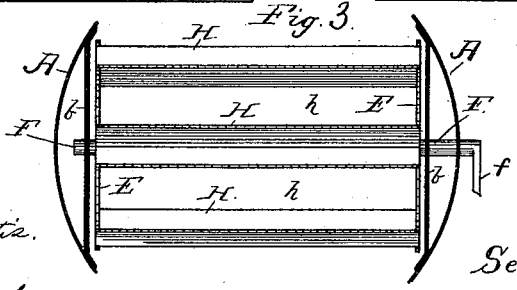
Witnesses:
Lew. C. Curtis.
H. W. Munday.
Inventor:
Sereno E. Norton.
By Munday, Evarts & Adcock
His Attorneys.

UNITED STATES PATENT OFFICE.

SERENO E. NORTON, OF CHICAGO, ILLINOIS.

FLOUR-SIFTER SAFE.

SPECIFICATION forming part of Letters Patent No. 352,343, dated November 9, 1886.

Application filed February 26, 1886. Serial No. 193,300. (No model.)

*To all whom it may concern:*

Be it known that I, SERENO E. NORTON, a citizen of the United States, residing in Chicago, in the county of Cook and State of Illinois, have invented a new and useful Improvement in Flour-Sifter Safes, of which the following is a specification.

My invention relates to certain improvements in that class of flour-safes which are provided with sifting devices at their bottoms, so that the flour may be sifted as it is removed from the safes. In such safes, especially if they are of sufficient capacity to hold the necessary or any considerable quantity of flour, the weight of the flour tends to cause it to become more or less packed, and thus frequently renders the operation of the sifting devices very slow and tedious, even if the sifting is not thereby entirely impeded.

My invention consists in a flour-safe of capacity to contain, say, fifty or one hundred pounds of flour, and comprising a rectangular base, a flour-pan fitting in said base to receive the sifted flour, a horizontal semi-cylindrical sieve secured near the bottom of the safe and above the pan for the sifted flour, and a horizontal rotary skeleton stirrer having V-shaped blades concentric with said sieve, and having their apices arranged radially inward, so that their outer V-shaped recesses will receive and carry the flour around against the sieve and rub it through the same. By this means, notwithstanding the packing tendency of the mass of flour in the safe, the flour will be continuously forced through the sieve by the V shaped blades in the skeleton stirrer as it is revolved by its crank.

In the accompanying drawings, which form a part of this specification, and in which similar letters of reference indicate like parts, Figure 1 is a front elevation, partly broken away, of a flour-safe embodying my invention. Fig. 2 is a central vertical section, and Fig. 3 is a detail view of the stirrer.

In said drawings, A represents a flour-safe, preferably made of tin and of a cylindrical form, having a removable tight-fitting cover, *a*, furnished with a handle, *a'*. The safe has a square or rectangular base, B, in which fits a flour pan or drawer, C, to receive the sifted flour, having a handle, *c*. Near the bottom of the safe A, and just above the flour-pan C, is a semi-cylindrical, or nearly semi-cylindrical, stationary sieve, D. This sieve D is secured to the inclined or hopper plates *d*, which serve to contract the area of the can or safe. The semi-cylindrical sieve D extends horizontally and centrally across the safe A.

E is the horizontal rotary skeleton stirrer, having a shaft, F, provided with a crank, *f*. This skeleton stirrer consists of the two disks E E, having V-notches *e* in their peripheries, secured to the shaft F, to which disks and in said notches *e* are secured, by solder or otherwise, the trough or V shaped stirrer blades or arms H. The V-shaped blades H should be about six in number and relatively of about the size shown, so as to leave open spaces *h* between them. These V-shaped blades or arms of the rotary stirrer will serve to crush all lumps and rub or force the flour through the stationary sieve continuously and evenly. The V-shaped blades H may preferably be made of tin. The shaft F of the stirrer is journaled in suitable journal-pieces, *b b*, secured on the inside of the safe A. The end of the shaft F which carries the crank *f* projects through a suitable opening in the wall of the safe.

I claim—

1. A flour-safe, A, comprising a rectangular base, B, flour-pan C, fitting in said base, horizontal semi-cylindrical sieve D, secured near the bottom of said safe above said pan, a horizontal rotary skeleton stirrer, E, having V-shaped blades H concentric with said sieve, and a shaft and crank for revolving the same, said V-shaped blades being arranged with their apices radially inward, so that their outer V shaped recesses will receive and carry the flour around against the sieve and rub it through the same, substantially as specified.

2. A flour-safe, A, comprising a rectangular base, B, flour-pan C, fitting in said base, horizontal semi-cylindrical sieve D, secured near the bottom of said safe above said pan, a horizontal rotary skeleton stirrer consisting of disks E E, having notches *e*, shaft F, V-shaped blades H, secured in the notches of said disks, and crank *f*, said V-shaped blades being arranged with their apices radially inward, so that their outer V-shaped recesses will receive and carry the flour around against the sieve and rub it through the same, substantially as specified.

SERENO E. NORTON.

Witnesses:
EDMUND ADCOCK,
H. M. MUNDAY.